(12) United States Patent
Bernardini et al.

(10) Patent No.: US 6,968,299 B1
(45) Date of Patent: Nov. 22, 2005

(54) METHOD AND APPARATUS FOR RECONSTRUCTING A SURFACE USING A BALL-PIVOTING ALGORITHM

(75) Inventors: Fausto Bernardini, Hartsdale, NY (US); Joshua David Mittleman, Croton-on-Hudson, NY (US); Holly E. Rushmeier, Mount Kisco, NY (US); Claudio T. Silva, Mahwah, NJ (US); Gabriel Taubin, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/549,432

(22) Filed: Apr. 14, 2000

(51) Int. Cl.[7] ............................................. G06F 17/10
(52) U.S. Cl. .................. 703/2; 703/1; 703/6; 345/424; 345/475
(58) Field of Search .................... 703/1, 2, 6; 345/424, 345/475

(56) References Cited

U.S. PATENT DOCUMENTS

| | | | |
|---|---|---|---|
| 5,465,323 A * | 11/1995 | Mallet ........................ | 345/423 |
| 5,988,862 A * | 11/1999 | Kacyra et al. ................ | 703/6 |
| 6,606,091 B2 * | 8/2003 | Liang et al. ................ | 345/424 |

OTHER PUBLICATIONS

Boissonnat, "Geometric Structure for Three-Dimensional Shape Representation", ACM Transactions on Graphics, vol. 3, Issue 4, Oct. 1984, pp. 266-286.*

Hoppe et al., "Surface Reconstruction from Unorganized points", Computer Graphics (SIGGRAPH '92 Proceedings), Jul. 1992, pp. 71-78.*

Pulli et al., "Robust meshes from multiple range maps", Proceedings of International of Conference on Recent Advances in 3-D Digital Imaging and Modeling, May 1997, pp. 205-211.*

Crossno et al., "Spiraling Edge: Fast Surface Reconstruction from Partially Organized Sample Points", Proceedings of Visualization '99, Oct. 1999, pp. 317-324.*

Bernardini et al., "Sampling and Reconstructing Manifolds Using Alpha-shapes," in Proc. of the Ninth Canadian Conference on Computational Geometry, pp. 193-198, (Aug. 1997).

* cited by examiner

*Primary Examiner*—Thai Phan
*Assistant Examiner*—Herng-der Day
(74) *Attorney, Agent, or Firm*—Ryan, Mason & Lewis, LLP; Satheesh K. Karra, Esq.

(57) ABSTRACT

A method and apparatus are disclosed for finding a triangle mesh that interpolates a set of points obtained from a scanning system. A ball-pivoting algorithm computes a triangle mesh interpolating a given point cloud. The disclosed ball-pivoting algorithm triangulates a set of points by "rolling" a ball of radius r on the point cloud. The points are surface samples acquired with multiple range scans of an object. The ball-pivoting algorithm starts with a seed triangle, and pivots the ball of a given radius, r, around an edge of the triangle. During the pivoting operation, the ball revolves around the edge while keeping in contact with the edge's endpoints. The ball pivots until it touches another scan point, forming another triangle. The ball-pivoting operation continues until all reachable edges have been tried, and then starts from another seed triangle, until all scan points have been considered.

30 Claims, 16 Drawing Sheets

810

| VX0 | VY0 | VZ0 |
|-----|-----|-----|
| NX0 | NY0 | NZ0 |
| VX1 | VY1 | VZ1 |
| NX1 | NY1 | NZ1 |
| ⋮ | ⋮ | ⋮ |

| 910 | 912 | 914 |
|---|---|---|
| VERTEX_ID | EDGE_ID | EDGE_FIRST |
| LOOP_ID | LOOP_ID | |
| EDGE_IN | VERTEX_FROM | |
| EDGE_OUT | VERTEX_TO | |
| SCAN_ID | OPP_VERTEX_ID | |
| VX, VY, VZ | OVX, OVY, OVZ | |
| | TNX, TNY, TNZ | |
| | CX, CY, CZ | |

METHOD AND APPARATUS FOR RECONSTRUCTING A SURFACE USING A BALL-PIVOTING ALGORITHM

FIELD OF THE INVENTION

The present invention relates generally to surface reconstruction techniques and, more particularly, to methods and apparatus for finding a triangle mesh that interpolates a set of points obtained from a scanning system.

BACKGROUND OF THE INVENTION

Recent advances in three dimensional (3D) data-acquisition hardware have facilitated the increasing use of scanning techniques to document the geometry of physical objects. For example, an object may be scanned for archival purposes or as a step in the design of new products. Recently, there has been a proliferation of scanning equipment and algorithms for synthesizing models from scanned data. For a more detailed discussion of research in this field, see, for example, F. Bernardini, C. Bajaj, J. Chen, and D. Schikore, "Automatic reconstruction of 3D CAD models from digital scans," International Journal of Computational Geometry and Applications, Vol. 9, no. 4 & 5, pp. 327–370, August–October 1999; R. Mencl and H. Muller, "Interpolation and approximation of surfaces from three-dimensional scattered data points," in Proc. of Eurographics '98, State of the Art Reports (1998), incorporated by reference herein.

In order to represent the geometry of an object using a computer model, a continuous representation of the object surface must be computed from the scan data that captures features having a length scale of at least 2d, where d is a value dictated by the application. In order to capture features of scale 2d, the surface must be sampled with a spatial resolution of d or less. The surface may consist of large areas that can be sufficiently approximated by much sparser meshes. However, in the absence of a priori information, the scanning must start with a sampling resolution of d or less to guarantee that no feature is missed.

An ideal acquisition system returns samples lying exactly on the object surface. Any real measurement system, however, introduces some error. Nonetheless, if a system returns samples with an error that is orders of magnitude smaller than the minimum feature size, the sampling can generally be regarded as "perfect." A surface can then be reconstructed by finding an interpolating mesh without additional operations on the measured data. Most scanning systems still need to account for acquisition error. There are two sources of error: error in registration and error along the sensor line of sight. Estimates of actual surface points are usually derived by averaging samples from redundant scans. These estimates are then connected into a triangle mesh.

Most methods for estimating surface points depend on data structures that facilitate the construction of the mesh. Two classes of methods have been successfully used for large data sets. Both methods assume negligible registration error and compute estimates to correct for line-of-sight error. The first of these classes is referred to as volumetric methods, such as those discussed, for example, in B. Curless and M. Levoy, "A volumetric method for building complex models from range images," in Computer Graphics Proceedings, 1996, Annual Conference Series, Proceedings of SIGGRAPH 96, PP. 303–312, incorporated by reference herein. In volumetric methods, individual aligned meshes are used to compute a signed-distance function on a volume grid encompassing the object. Estimated surface points are computed as the points on the grid where the distance function is zero. The structure of the volume then facilitates the construction of a mesh using the marching cubes algorithm, described in W. Lorensen and H. Cline, "Marching cubes: a high resolution 3d surface construction algorithm," Comput. Graph., vol. 21, no. 4, pp. 163–170, 1987, incorporated by reference herein.

The second class of methods are mesh stitching methods, such as the technique described in M. Soucy and D. Laurendeau, "A general surface approach to the integration of a set of range views," IEEE Transactions on Pattern Analysis and Machine Intelligence, vol. 17, no. 4, pp. 344–358, April 1995, incorporated by reference herein. Disjoint height-field meshes are stitched into a single surface. Disjoint regions are defined by finding areas of overlap of different subsets of the set of scans. Estimated surface points for each region are computed as weighted averages of points from the overlapping scans. Estimated points in each region are then re-triangulated, and the resulting meshes are stitched into a single mesh. Turk and Levoy developed a similar method, described in G. Turk and M. Levoy, "Zippered polygonal meshes from range images," in Computer Graphics Proceedings, 1994, Annual Conference Series. Proceedings of SIGGRAPH 94, pp. 311–318, incorporated by reference herein, which first stitches (or zippers) the disjoint meshes and then computes estimated surface points.

In both classes of methods, the method of estimating surface points need not be so closely linked to the interpolating method for constructing the final mesh. In the volumetric approach, a technique other than marching cubes could be used for finding a triangle mesh passing through the estimated surface points. In the mesh-joining approaches, a technique for finding a mesh connecting all estimated surface points could be used in place of stitching together the existing meshes. Most importantly, with an efficient algorithm for computing a mesh which joins points, any method for computing estimated surface points could be used, including those that do not impose additional structure on the data and do not treat registration and line-of-sight error separately. For example, it has been demonstrated that reducing error in individual meshes before alignment can reduce registration error. See, C. Dorai, G. Wang, A. K. Jain, and C. Mercer, "Registration and integration of multiple object views for 3D model construction," IEEE Transactions on Pattern Analysis and Machine Intelligence, vol. 20, no. 1, pp. 83–89, January 1998, incorporated by reference herein.

Existing interpolating techniques fall into two categories, namely, sculpting-based and region-growing techniques. Generally, in sculpting-based methods, a volume tetrahedralization is computed from the data points, typically the three-dimensional Delaunay triangulation. Tetrahedra are then removed from the convex hull to extract the original shape. For a more detailed discussion of sculpting-based methods, see, for example, C. Bajaj, F. Bernardini, and G. Xu, "Automatic reconstruction of surfaces and scalar fields from 3D scans," in Computer Graphics Proceedings, 1995, Annual Conference Series. Proceedings of SIGGRAPH 95, pp. 109–118; N. Amenta, M. Bern, and M. Kamvysselis, "A new voronoi-based surface reconstruction algorithm," in Proc.SIGGRAPH '98, July 1998, Computer Graphics Proceedings, Annual Conference Series, PP. 415–412; F. Bernardini, C. Bajaj, J. Chen, and D. Schikore, "Automatic reconstruction of 3D CAD models from digital scans," International Journal of Computational Geometry and Applications, Vol. 9, no. 4 & 5, pp. 327–370, August–October 1999, each incorporated by reference herein. Generally, region-growing methods start with a seed triangle, consider a new point and join it to the existing region boundary, and continue until all points have been considered. For a more detailed discussion of region-growing methods, see, for example, J. D. Boissonnat, "Geometric structures for three-dimensional shape representation," ACM Trans. Graph., vol. 3, no. 4, pp. 266–286, 1984; R. Mencel, "A graph-based approach to surface reconstruction," Computer Graphics Forum, vol. 14, no. 3, pp. 445–456, 1995, Proc. of EUROGRAPHICS '95; A. Hilton, A. Stoddart, J. Illingworth, and T. Windeatt, "Marching triangles: Range image fusion for complex object modelling," in Proc of IEEE International Conference on Image Processing, Laussane, 1996, vol. 2, pp. 381–384; incorporated by reference herein.

The strength of sculpting-based approaches is that they often provide theoretical guarantees for the quality of the resulting surface, e.g., that the topology is correct, and that the surface converges to the true surface as the sampling density increases. See, for example, F. Bernardini and C. Bajaj, "Sampling and reconstructing manifolds using alpha-shapes, in Proc. of the Ninth Canadian Conference on Computational Geometry, August 1997, pp. 193–198, Updated online version available at www.qucis.queensu.ca/cccg97; Nina Amenta and Marshall Bern, "Surface reconstruction by voronoi filtering," in Proc. 14the Annual ACM Sympos. Comput. Geom., 1998, pp. 39–48; incorporated by reference herein. However, computing the required three-dimensional Delaunay triangulation can be prohibitively expensive in terms of time and memory required, and can lead to numerical instability when dealing with data sets of millions of points.

A need therefore exists for a method and apparatus for finding a triangle mesh that retains the strengths of previous interpolating techniques in a method that exhibits linear time complexity and robustness on real scanned data. A further need exists for a method and apparatus for finding a triangle mesh that interpolates an unorganized set of points. A further need exists for a surface reconstruction method that moves samples within known scanner error bounds to conform the meshes to one another as they are aligned. Yet another need exists for a surface reconstruction method that finds an interpolating mesh from measured data even if it contains uncompensated error.

SUMMARY OF THE INVENTION

Generally, a method and apparatus are disclosed for finding a triangle mesh that interpolates a set of points obtained from a scanning system. According to one aspect of the invention, a ball-pivoting algorithm computes a triangle mesh interpolating a given point cloud. The disclosed ball-pivoting algorithm triangulates a set of points by "rolling" a ball of radius $\pi$ on the point cloud. Typically, the points are surface samples acquired with multiple range scans of an object. The ball-pivoting algorithm starts with a seed triangle, and pivots the ball of a given radius, $\rho$, around an edge of the triangle. During the pivoting operation, the ball revolves around the edge while keeping in contact with the edge's endpoints. The ball pivots until it touches another scan point, forming another triangle. The ball-pivoting operation continues until all reachable edges have been tried, and then starts from another seed triangle, until all scan points have been considered.

The invention is a region-growing method that starts with the seed triangle, and implements the ball pivoting algorithm to pivot a ball around each edge on the current mesh boundary until a new point is hit by the ball. The edge and point define a new triangle, which is added to the mesh, and the algorithm considers a new boundary edge for pivoting.

The ball pivoting algorithm is efficient in terms of execution time and storage requirements. It exhibits linear time performance on large datasets. The present invention can be implemented in a form that does not require all of the input data to be loaded into memory simultaneously. The resulting triangle mesh is incrementally saved to external storage during its computation, and does not use any additional memory. The ball-pivoting algorithm is related to alpha-shapes, and given sufficiently dense sampling, it reconstructs a surface homeomorphic to and within a bounded distance from the original manifold.

A more complete understanding of the present invention, as well as further features and advantages of the present invention, will be obtained by reference to the following detailed description and drawings.

DETAILED DESCRIPTION OF PREFERRED EMBODIMENTS

Figure 1A:
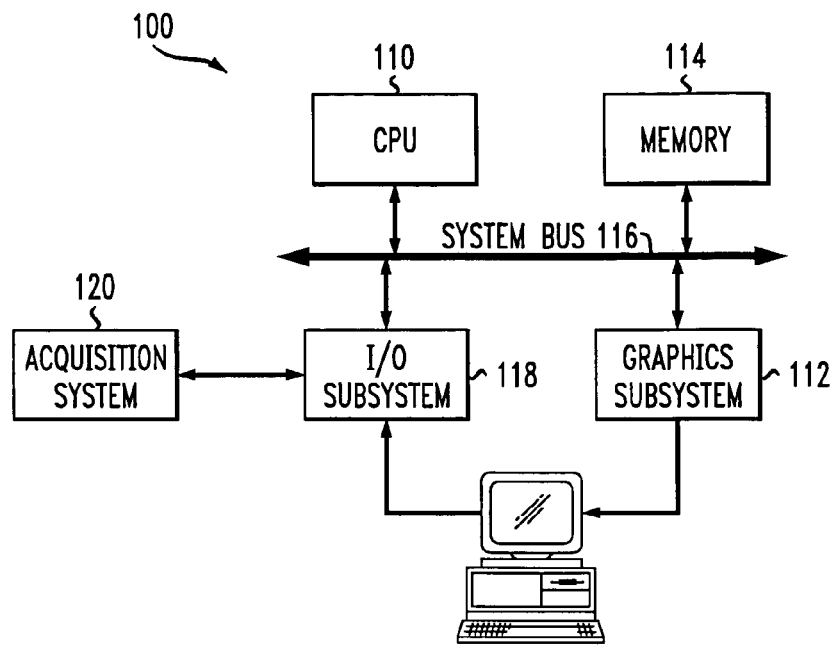
FIG. 1A is a schematic block diagram of a surface reconstruction system in accordance with the present invention.

FIG. 1A is a schematic block diagram of a surface reconstruction system 100 in accordance with the present invention. The surface reconstruction system 100 is used for the acquisition of three-dimensional shape information. As shown in FIG. 1A, the surface reconstruction system 100 includes certain standard hardware components, such as a central processing unit 110, a memory subsystem 114, an input/output (I/O) subsystem 118 and a graphics subsystem 112, all communicating through a system bus 116. As discussed further below, data captured by sensors (not shown) in the acquisition system 120 are transferred through the input/output (I/O) subsystem 118 to memory for further processing.

The acquisition system 120 may be embodied, for example, as Rapid 3D Color Digitizer Model 3030, commercially available from CyberWare of Monterey, Calif. More generally, the acquisition system 120 produces sets of range images, i.e. arrays of depths, each of which covers a subset of the full surface. Because they are height fields with regular sampling, individual range images are easily meshed. The individual meshes can be used to compute an estimated surface normal for each sample point.

As discussed further below, the present invention is a region-growing method that starts with a seed triangle, and implements a ball pivoting algorithm 300, discussed below in conjunction with FIG. 3, to pivot a ball around each edge on the current mesh boundary until a new point is hit by the ball. The edge and point define a new triangle, which is added to the mesh, and the algorithm considers a new boundary edge for pivoting. The ball pivoting algorithm 300 generates an output mesh that is a manifold subset of an alpha-shape of the point set. Some of the nice properties of alpha-shapes can also be proved for our reconstruction. For a more detailed discussion of alpha-shapes, see, for example, H. Edelsbrunner and E. P. Mucke, "Three-dimensional alpha shapes," ACM Trans. Graph., vol. 13, no. 1, pp. 43–72, January 1994; H. Edelsbrunner, "Weighted alpha shapes," Technical Report UIUCDCS-R-92-1760. Dept. Comput. Sci., Univ. Illinois, Urbana, Ill., 1992, each incorporated by reference herein.

Figure 1B:
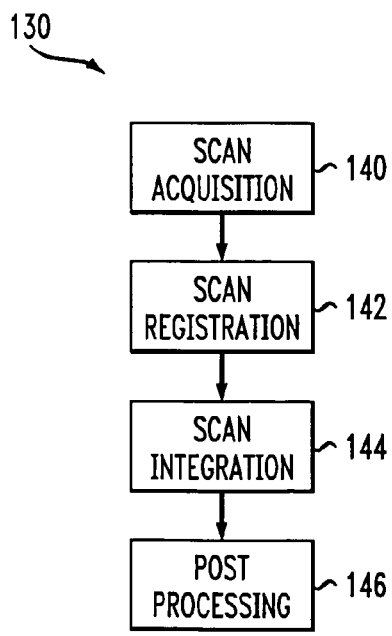
FIG. 1B illustrates a surface reconstruction process in accordance with the present invention.

FIG. 1B illustrates a surface reconstruction process 130. As shown in FIG. 1B, the surface reconstruction process 130 initially acquires three-dimensional data during a scanning step 140 in the form of multiple surface samples using a measurement device, such as a laser range scanner or a stereographic system. Thereafter, a data registration step 142 is performed to align several scans of data into a single coordinate system. The measured samples (or points derived from the measured samples) are then interpolated during a data integration step 144 with a surface representation, such as a triangle mesh. Finally, the computed surface is transformed during step 146 into one of a number of representations, for example, using a mesh decimation/optimization, fitting with higher-order representations.

Figure 1C:
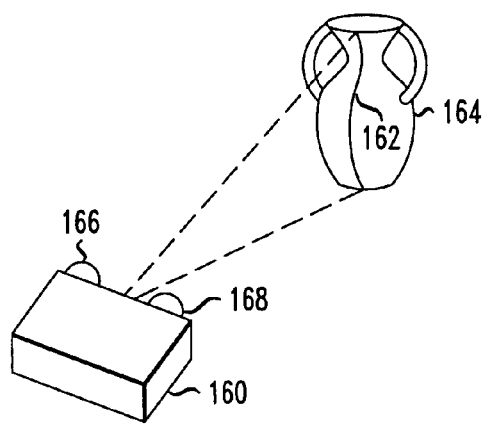
FIG. 1C illustrates the scanning step of FIG. 1B in further detail.

FIG. 1C illustrates the scanning step 140 of FIG. 1B in further detail. As shown in FIG. 1C, a three-dimensional scanner 160 scanning an object 164. A laser source (not shown) projects a stripe of light 162 onto the object 164. Two digital cameras 166, 168 capture the shape of the stripe from different angles, in a known manner. Digital processing techniques are used to compute the distance of a number of points on the stripe with respect to the sensors 166, 168.

Figure 1D:
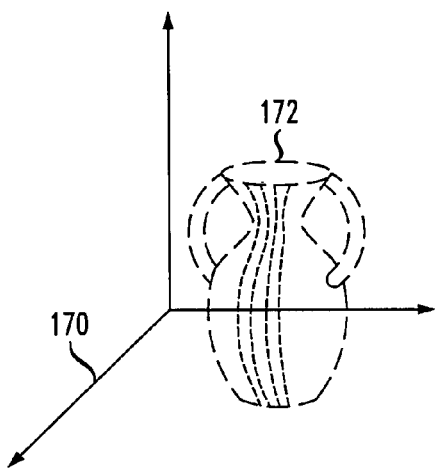
FIG. 1D illustrates the data registration step of FIG. 1B in further detail.

FIG. 1D illustrates the data registration step 142 of FIG. 1B in further detail. As shown in FIG. 1D, multiple stripes 172 are acquired, usually by moving the laser beam 162 to sweep a region of the object surface. For all but the simplest objects, this process is generally repeated from multiple viewpoints, so that the sensors 166, 168 can "see" every portion of the object surface. The multiple scans are registered, or aligned, into a single coordinate frame 170. The measured points form an unorganized point cloud.

Figure 1E:
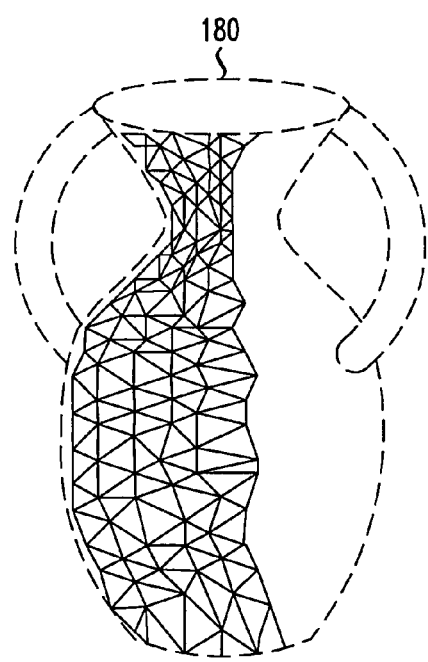
FIG. 1E illustrates the data integration step of FIG. 1B in further detail.

FIG. 1E illustrates the data integration step 144 of FIG. 1B in further detail. As shown in FIG. 1E, a triangle mesh 180 connecting the measured points is computed during the data integration phase. The result of the data integration step is a three-dimensional geometric model of the surface of the object. In subsequent operations, the mesh 180 can be simplified, texture maps can be applied to the mesh 180, or the mesh 180 can be converted to a curved surface representation, such as Non-Uniform Rational B-Splines (NURBS).

Figure 1F:
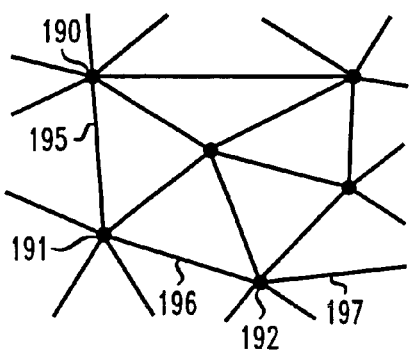
FIG. 1F illustrates the computed triangle mesh of FIG. 1E in further detail.

FIG. 1F illustrates the computed triangle mesh 180 of FIG. 1E in further detail. The black dots shown in FIG. 1F represent the data points 190–192 measured by the scanner 160. The lines 195–197 are triangle edges.

Surface Reconstruction and Ball-Pivoting

Figure 2A:
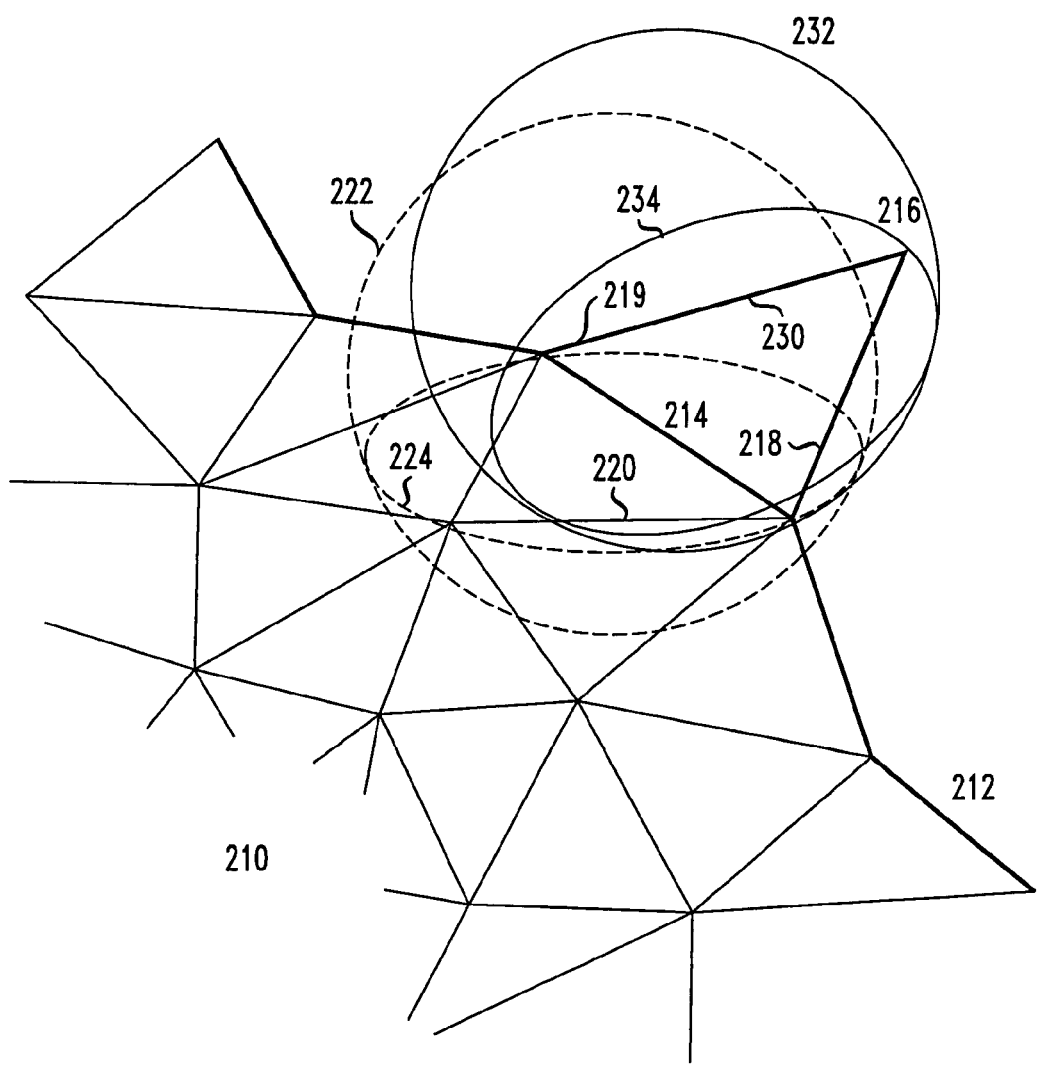
FIG. 2A illustrates an example of the ball-pivoting operation in accordance with the present invention.

FIG. 2A illustrates an example of the ball-pivoting operation in accordance with the present invention. As shown in FIG. 2A, a triangle mesh 210 has been partially computed. An active-edges front 212 represents the boundary of the meshed region. An edge 214 is selected for the ball-pivoting operation. The current ball for edge 214 is represented by the dotted circle 222. This ball 222 is in contact with the three vertices of triangle 220. The intersection of the ball 222 with the plane containing triangle 220 is represented by the dotted ellipse 224. The ball 222 rotates around edge 214 while keeping in contact with its two endpoints.

Figure 2B:
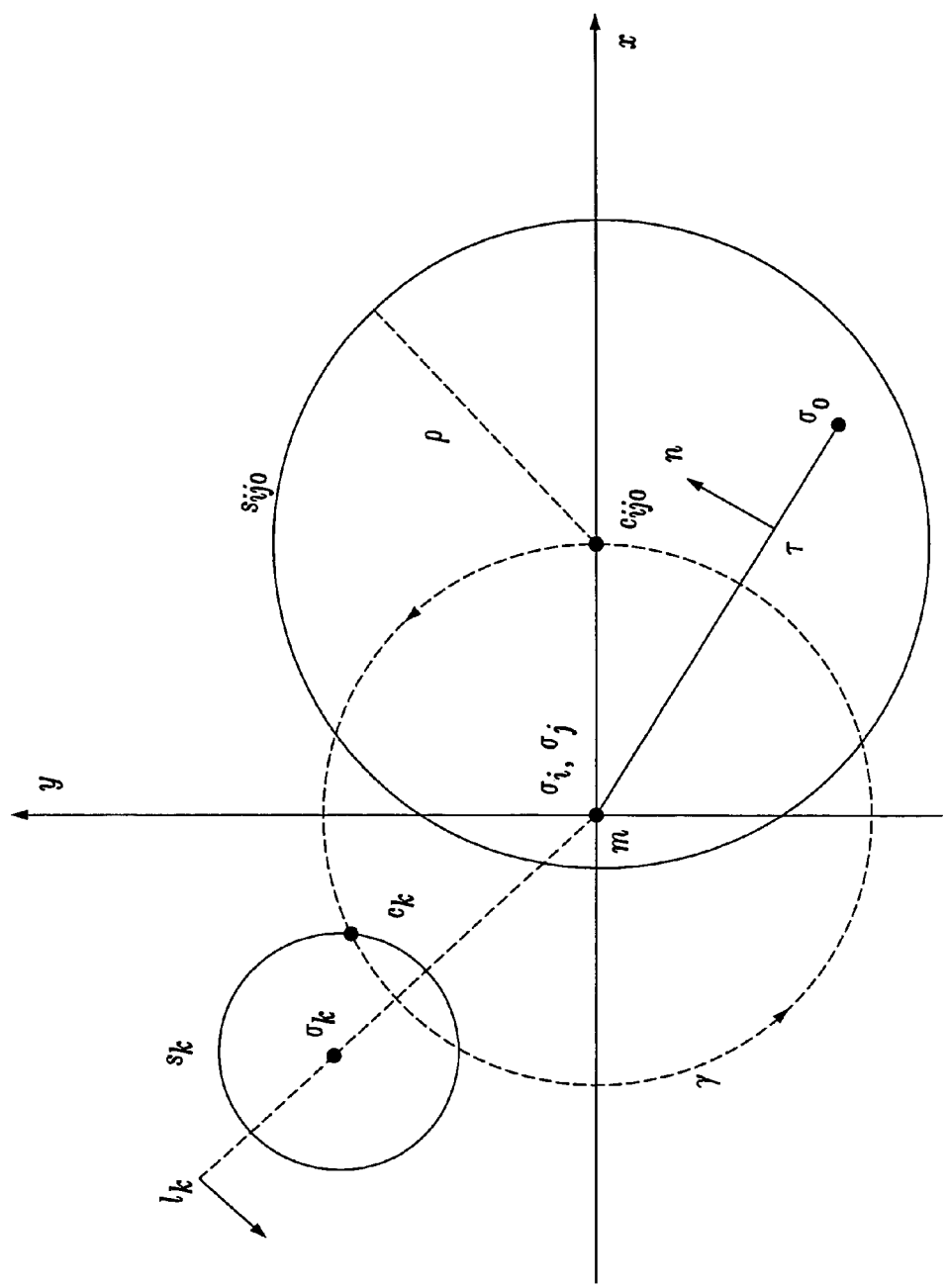
FIG. 2B is a two-dimensional illustration of the ball-pivoting operation in accordance with the present invention.

In the example shown in FIG. 2A, the ball rotates freely until it touches a new data point 216. The position of the ball 222 when it comes in contact with point 216 is represented by the solid circle 232, and its intersection with the plane containing edge 214 and point 216 is represented by the solid ellipse 234. The new data point 216 forms a triangle 230 with the endpoints of pivoting edge 214. The new triangle 230 becomes part of the triangle mesh being created. The active-edge front 212 is updated by removing edge 214 and inserting the newly created edges 218 and 219, and the process continues with the selection of a new pivoting edge from the active-edge front 212. FIG. 2B is a two-dimensional illustration of the ball-pivoting operation in accordance with the present invention.

As shown in FIG. 2B, the pivoting ball is in contact with the three vertices of triangle $\tau$ equal to $(\sigma_i, \sigma_j, \sigma_0)$, whose normal is n. The pivoting edge e(i, j) lies on the z axis (perpendicular to the page and pointing towards the reader), with its midpoint m at the origin. The circle $s_{ijo}$ is the intersection of the pivoting ball with the xy plane. The coordinate frame is chosen such that the center $c_{ijo}$ of the ball lies on the positive x axis. During pivoting, the $\rho$-ball stays in contact with the two edge endpoints $(\sigma_i, \sigma_j)$ and its center describes a circular trajectory $\gamma$ with center in m and radius $\|c_{ijo}-m\|$. In its pivoting motion, the ball may hit a new data point $\sigma_k$. Let $s_k$ be the intersection of a $\rho$-sphere centered at $\sigma_k$ with the xy plane. The center $c_k$ of the pivoting ball when it touches $\sigma_k$ is the intersection of $\gamma$ with $s_k$ lying on the negative halfplane of oriented line $l_k$.

In practice $\sigma_k$ is found as follows. All points in a $2\rho$-neighborhood of m are considered. For each such point $\sigma_x$, the center $c_x$ of the ball touching $\sigma_i$, $\sigma_j$ and $\sigma_x$, is computed if such a ball exists. Each $c_x$ lies on the circular trajectory $\gamma$ around m, and can be computed by intersecting a $\rho$-sphere centered at $\sigma_x$ with the circle $\gamma$. Of these points $c_x$, the one that is first along the trajectory $\gamma$ is selected. The first point hit and the corresponding ball center are reported. Trivial rejection tests can be added to speed up finding the first hit-point.

Alpha-Shapes

As previously indicated, the ball-pivoting algorithm is related to alpha-shapes. In fact, every triangle $\tau$ computed by the $\rho$-ball walk obviously has an empty smallest open ball $b_\tau$, whose radius is less than $\rho$. Thus, the ball-pivoting algorithm computes a subset of the 2-faces of the $\rho$-shape of S. These faces are also a subset of the 2-skeleton of the three-dimensional Delaunay triangulation of the point set. Alpha shapes are an effective tool for computing the "shape" of a point set. The surface reconstructed by the ball-pivoting algorithm retains some of the qualities of alpha-shapes: It has provable reconstruction guarantees under certain sampling assumptions, and an intuitively simple geometric meaning.

However, the 2-skeleton of an alpha-shape computed from a noisy sampling of a smooth manifold can contain multiple non-manifold connections. It is non-trivial to filter out unwanted components. Also, in their original formulation, alpha-shapes are computed by extracting a subset of the three-dimensional Delaunay triangulation of the point set, a data structure that is not easily computed for data sets of millions of points. With the assumptions on the input stated above, the ball-pivoting algorithm efficiently and robustly computes a manifold subset of an alpha-shape that is well suited for this application.

Sufficient conditions on the sampling density of a curve in the plane were derived in F. Bernardini and C. Bajaj, "Sampling and reconstructing manifolds using alpha-shapes," in Proc. of the Ninth Canadian Conference on Computational Geometry, August 1997, pp. 193–198, Updated online version available at www.qucis.queensu.ca/cccg97, incorporated by reference herein, that guarantee that the alpha-shape reconstruction is homeomorphic to the original manifold and that it lies within a bounded distance. The theorem can be extended to surfaces. For the smooth manifold M, the sampling S must satisfy the following properties. First, the intersection of any ball of radius $\rho$ with the manifold must be a topological disk. Second, any ball of radius $\rho$ centered on the manifold must contain at least one sample point in its interior.

The first condition guarantees that the radius of curvature of the manifold is larger than $\rho$, and that the $\rho$-ball can also pass through cavities and other concave features without multiple contacts with the surface. The second condition specifies that the sampling is dense enough that the ball can walk on the sample points without leaving holes. The ball-pivoting algorithm then produces a homeomorphic approximation T of the smooth manifold M. A homeomorphism h is also defined: T→M such that the distance $\|p-h(p)\|<\rho$.

The ball-pivoting algorithm makes two assumptions about the samples that are valid for a wide range of acquisition techniques: that the samples are distributed over the entire surface with a spatial frequency greater than or equal to some application-specified minimum value, and that an estimate of the surface normal is available for each measured sample.

Figure 2C:
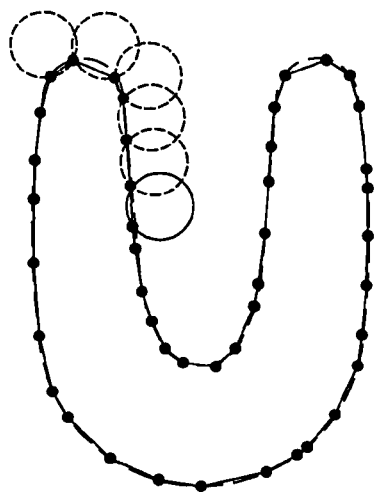
FIGS. 2C through 2E illustrate the ball-pivoting algorithm and demonstrate the conditions on the sampling density.
Figure 2D:
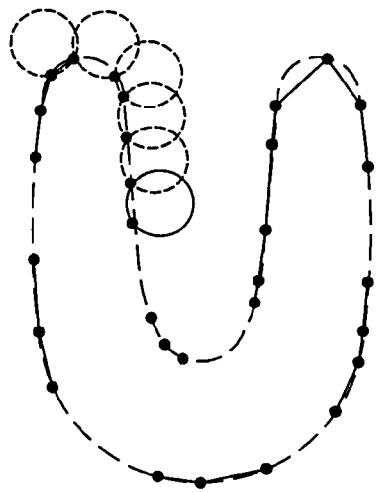
Figure 2E:
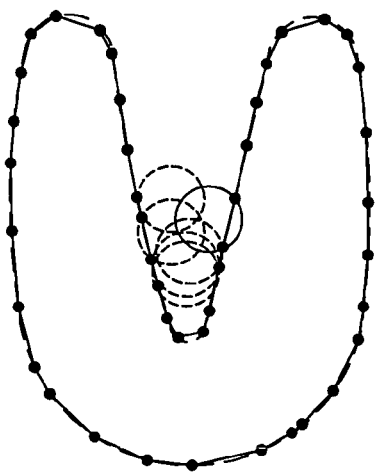

FIGS. 2C through 2E illustrate the ball-pivoting algorithm and demonstrate the conditions on the sampling density. FIG. 2C illustrates a circle of radius p pivoting from sampling point to sampling point in accordance with the ball-pivoting algorithm, connecting them with edges. As shown in FIG. 2D, when the sampling density is too low, some of the edges will not be created, leaving holes (condition 2). As shown in FIG. 2E, when the curvature of the manifold is larger than $1/\rho$, some of the sample points will not be reached by the pivoting ball, and features will be missed (condition 1).

In practice, samplings are often less-than-ideal. Typical problems are missing points, non-uniform density, imperfectly-aligned overlapping range scans, and scanner line-of-sight error. In addition, some types of scanners 160 also produce "outliers," or points that lie far from the actual surface. These outliers occur more frequently at the boundaries of range images, or in the presence of sharp discontinuities. Outlier removal is best done with device-dependent preprocessing.

The ball-pivoting algorithm of the present invention processes the output of an accurate registration/conformance algorithm, and does not attempt to average out noise or residual registration errors. Nonetheless, the ball-pivoting algorithm is robust in the presence of imperfect data.

Data points are augmented with approximate surface normals computed from the range maps to disambiguate cases that occur when dealing with missing or noisy data. For example, if parts of the surface have not been scanned, there will be holes larger than $\rho$ in the sampling. It is then impossible to distinguish an interior and an exterior region with respect to the sampling. Surface normals (for which an outward orientation is assumed) are used to decide surface orientation. For example, when choosing a seed triangle the surface normals are checked at the three vertices to ensure consistent orientation.

Figure 2F:
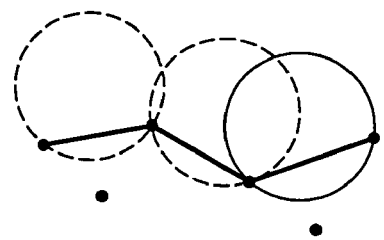
FIGS. 2F through 2H illustrate the ball-pivoting operation in the presence of noisy data.

Areas of density higher than $\rho$ present no problem. The pivoting ball will still "walk" on the points, forming small triangles. If the data is noise-free and $\rho$ is smaller than the local curvature, all points will be interpolated. More likely, points are affected by noise, and some points lying below the surface will not be touched by the ball and will not be part of the reconstructed mesh, as shown in FIG. 2F.

Figure 2G:
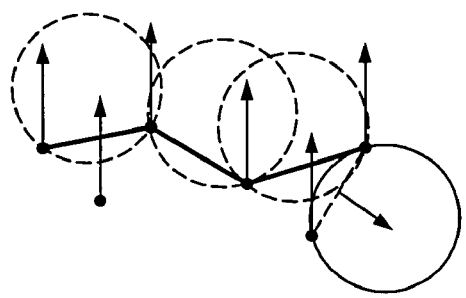

Missing points create holes that cannot be filled by the pivoting ball. Any post processing hole-filling algorithm could be employed; in particular, the ball-pivoting algorithm can be applied multiple times, with increasing ball radii, as discussed below. When pivoting around a boundary edge, the ball can touch an unused point lying close to the surface. Again, surface normals are used to decide whether the point touched is valid or not, as shown in FIG. 2G. A triangle is rejected if the dot product of its normal with the surface normal is negative. Thus, as a result of missing data, the ball pivots around an edge until it reaches a sample that belongs to a different part of the surface. By checking that the triangle and data point normals are consistently oriented, the improper generation of a triangle is avoided.

Figure 2H:
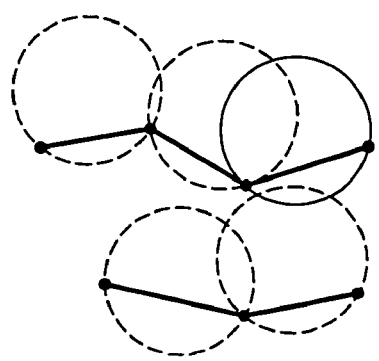

The presence of misaligned overlapping range scans can lead to poor results if the registration error is similar to the pivoting ball size. In other words, noisy samples form two layers, distant enough to allow the $\rho$ ball to "walk" on both layers. Undesired small connected components lying close to the main surface will be formed, and the main surface is affected by high frequency noise, as shown in FIG. 2H. The seed selection strategy of the present invention avoids creating a large number of such small components. A simple postprocessing that removes small components and surface smoothing, such as described in Gabriel Taubin, "A signal processing approach to fair surface design," in Proc. of SIGGRAPH '95, ACM Computer Graphics Proceedings, Annual Conference Series, 351–358, (August 1995), incorporated by reference herein, can significantly improve the result in these cases, at least aesthetically.

Regardless of the defects in the data, the ball-pivoting algorithm of the present invention is guaranteed to build an orientable manifold. It is noted that the ball-pivoting algorithm will always try to build the largest possible connected manifold from a given seed triangle.

Choosing a suitable value for the radius ρ of the pivoting ball is typically easy. Current structured-light or laser triangulation scanners produce very dense samplings, exceeding our requirement that intersample distance be less than half the size of features of interest. Knowledge of the sampling density characteristics of the scanner, and of the feature size to be captured, are enough to choose an appropriate radius. Alternatively, a small subset of the data could be analyzed to compute the point density. An uneven sampling might arise when scanning a complex surface, with regions that project into small areas in the scanner direction. The best approach is to take additional scans with the scanner perpendicular to such regions, to acquire additional data. It is noted, however, that the ball-pivoting algorithm can be applied multiple times, with increasing ball radii, to handle uneven sampling densities, as described below.

The Ball-Pivoting Algorithm

Figure 3:
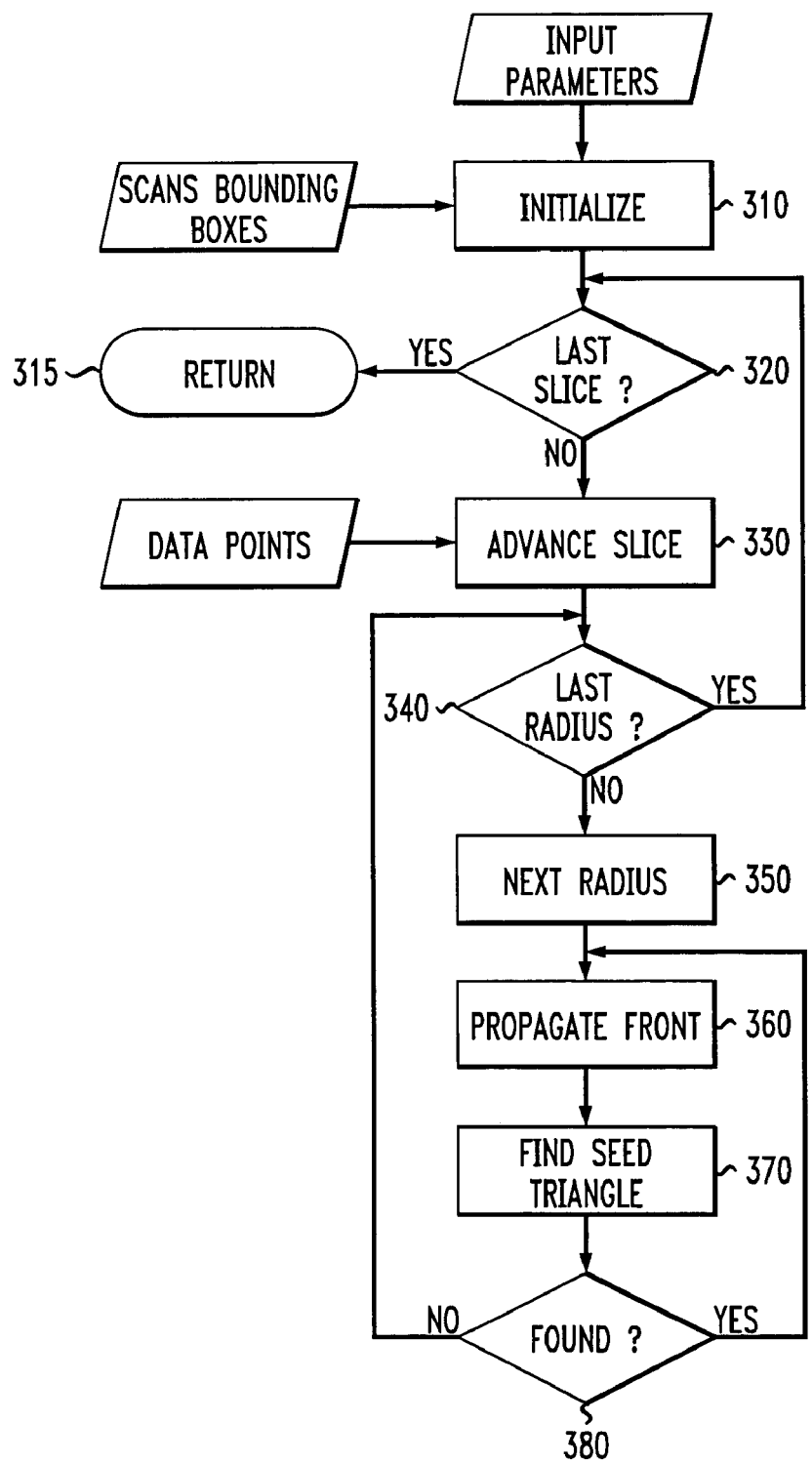
FIG. 3 is a flow chart describing the ball-pivoting algorithm in accordance with the present invention.

FIG. 3 is a flow chart describing the ball-pivoting algorithm 300 in accordance with the present invention. The ball-pivoting algorithm 300 follows the advancing-front paradigm to incrementally build an interpolating triangulation. As shown in FIG. 3, the ball-pivoting algorithm 300 takes as input a list of surface-sample data points, $\sigma_i$, each associated with a normal n (and other optional attributes, such as texture coordinates), and a ball radius ρ. Generally, the algorithm 300 works by finding a seed triangle (i.e., three data points $\sigma_i$, $\sigma_j$, $\sigma_k$) such that a ball of radius ρ touching them contains no other data point), and adding one triangle at a time by performing the ball pivoting operation in accordance with the present invention.

Figures 8A, 8B:
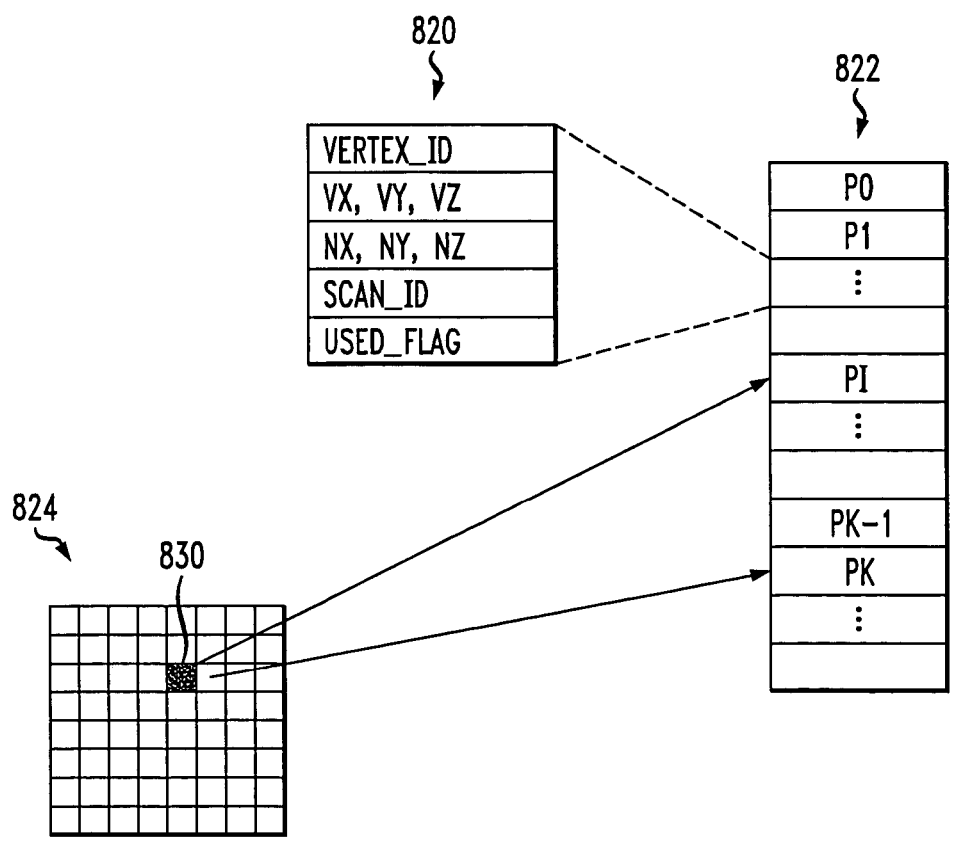
FIG. 8A is a diagram showing how input scan data can be stored in a file in an external storage device.
FIG. 8B is a diagram illustrating how data points are stored in memory.
Figures 9A, 9B:
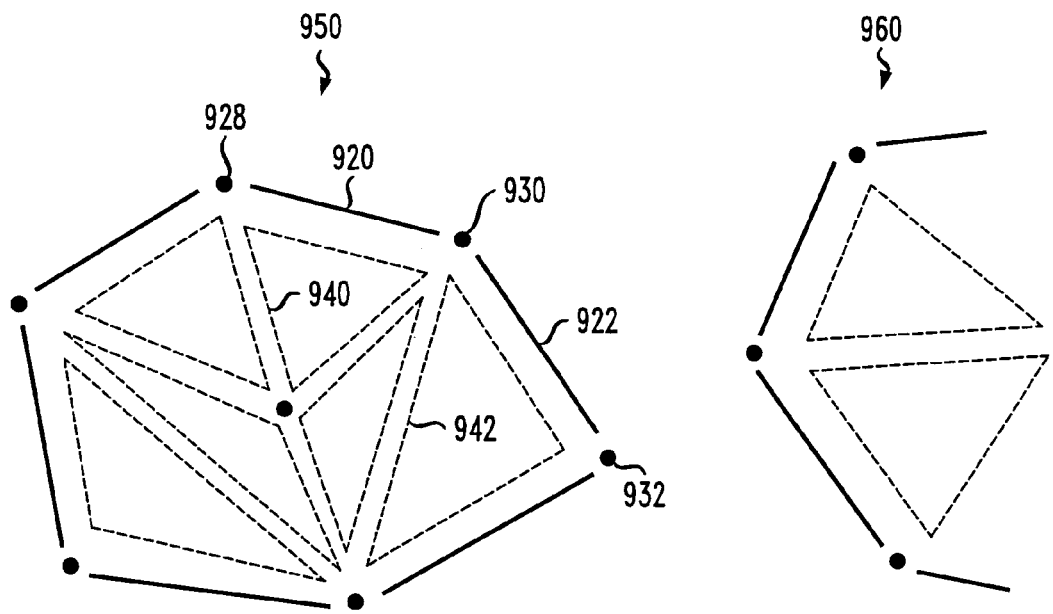
FIG. 9A is a diagram showing an example of the active-edge front.
FIG. 9B is a diagram illustrating the data structures used to represent the active-edge front shown in FIG. 9A.

First, the required data structures, discussed below in conjunction with FIGS. 8A, 8B and 9B, are initialized during step 310. The initialization of the data structures is discussed further below in conjunction with FIG. 4. Thereafter, a test is performed during step 320 to determine if all slices of a bounding volume of the object have been processed. If it is determined during step 320 that all slices of a bounding volume of the object have been processed, then program control returns during step 315. If, however, it is determined during step 320 that all slices of a bounding volume of the object have not been processed, then the active slice is advanced during step 330 to the next position. The advancing of the active slice is discussed further below in conjunction with FIG. 5.

A test is performed during step 340 to determine whether all radii have been processed for the current slice. If it is determined during step 340 that all radii have been processed for the current slice, then program control returns to step 320 and continues processing in the manner described above. If, however, it is determined during step 340 that all radii have not been processed for the current slice, then the next radii is considered during step 350.

During step 360 successive ball-pivoting operations are applied to the current active-edge front. During this processing, discussed further below in conjunction with FIG. 6, triangles connecting the data points are created and stored in memory or in external storage. When all possible active edges have been considered for ball-pivoting, program control returns to step 370, which searches for another valid seed triangle, discussed further below in a section entitled "Seed Selection." If it is determined during step 380 that a seed triangle has been found, then a new iteration of step 360 is initiated. If, however, it is determined during step 380 that another seed triangle has not been found, then program control returns to step 340 and continues in the manner described above.

Figure 4:
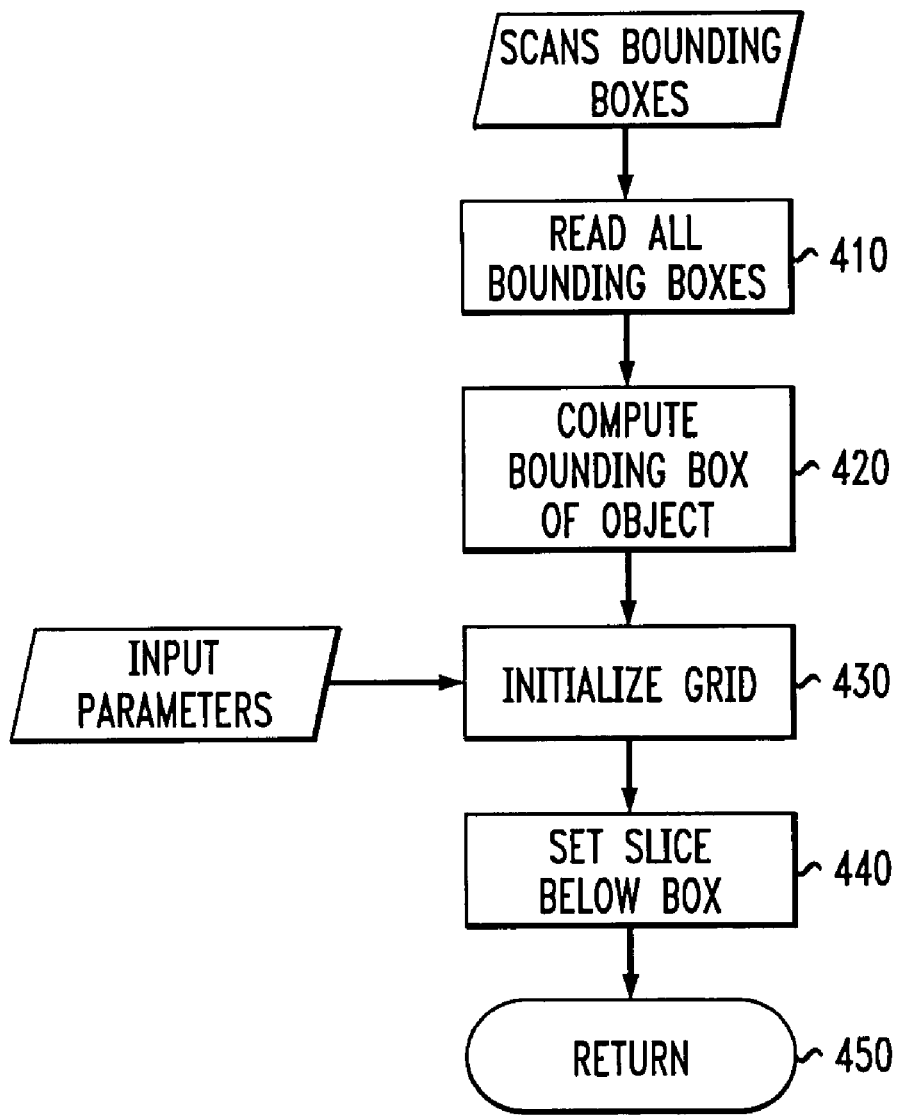
FIG. 4 is a flow chart illustrating a data structure initialization process utilized by the ball-pivoting algorithm of FIG. 3.

As previously indicated, the ball-pivoting algorithm 300 initializes required data structures during step 310. FIG. 4 is a flow chart illustrating a data structure initialization process 400. As shown in FIG. 4, bounding boxes, discussed further below in conjunction with FIG. 7, for all scans are read from external storage into memory during step 410. A bounding box for the collection of scans is computed during step 420. Based on the input parameters, a voxel grid, discussed below in conjunction with FIG. 8B, is initialized during step 430. Finally, during step 440, the current slice is positioned just below the box computed during step 420. Program control returns to the ball-pivoting algorithm 300 during step 450.

Figure 5:
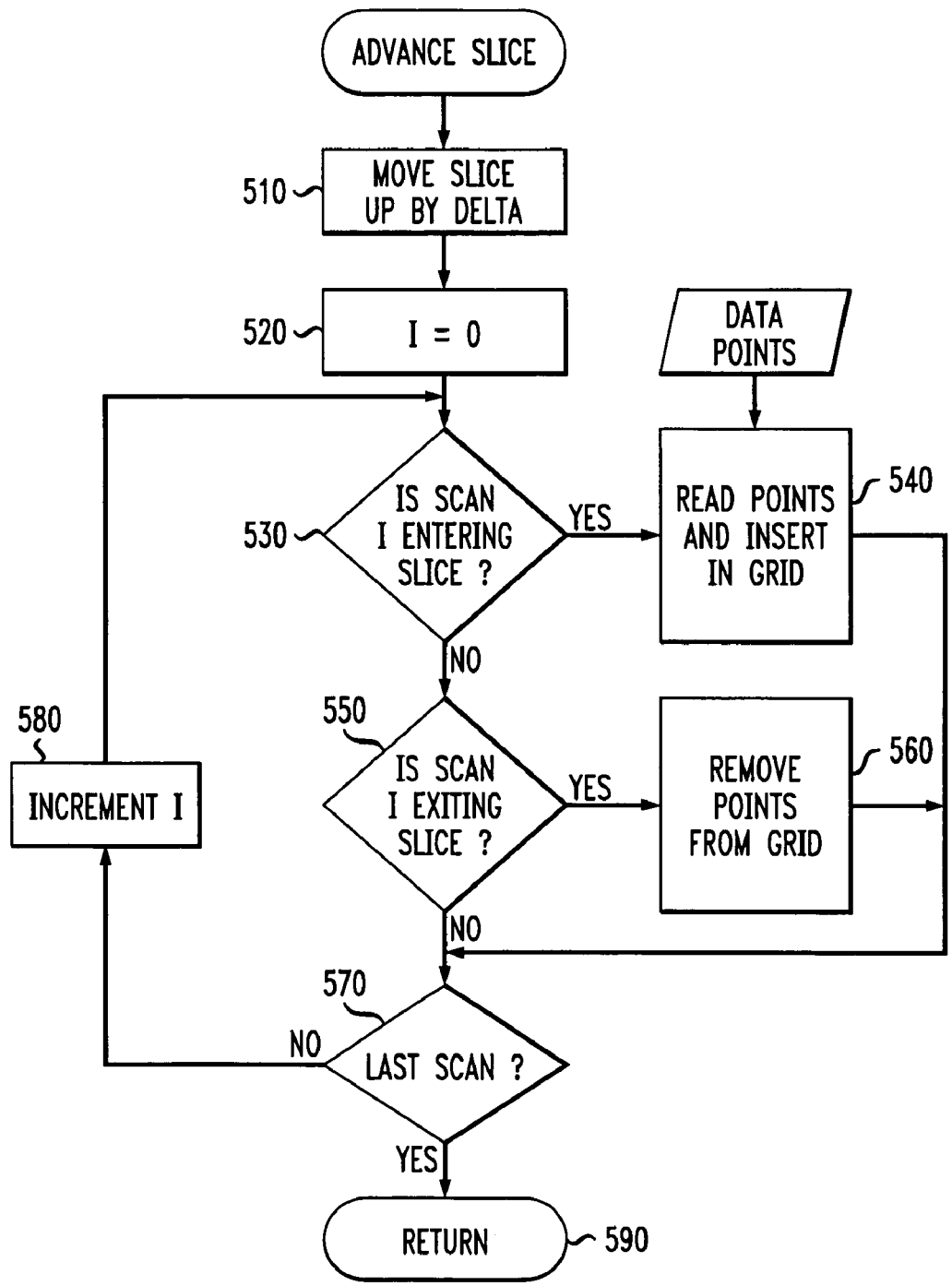
FIG. 5 is a flow chart illustrating an advance slice process utilized by the ball-pivoting algorithm of FIG. 3.

As previously indicated, the ball-pivoting algorithm 300 advances the active slice to the next position during step 330. FIG. 5 is a flow chart illustrating an advance slice process 500. As shown in FIG. 5, the slice parameters are adjusted during step 510 by adding a value, delta, to two variables, slice-minz and slice-maxz. A counter, I, is initialized to zero during step 520. A test is performed during step 530 to determine whether the bounding box of the current scan intersects the current slice. If it is determined during step 530 that the bounding box of the current scan intersects the current slice, then the data points of the scan are read from external storage into a grid data structure 824, discussed further below in conjunction with FIG. 8B, during step 540.

If, however, the current scan previously intersected the active slice, and it is determined during step 550 that the current scan no longer intersects the slice, then the scan data points are removed from the grid data structure 824, discussed further below in conjunction with FIG. 8B, during step 560. A further test is performed during step 570 to determine if there are additional scans to process. If it is determined during step 570 that there are additional scans to process, then the counter I is incremented during step 580 and processing continues until all scans have been considered. Once it is determined during step 570 that all scans have been considered, program control returns to the ball-pivoting algorithm 300 during step 590.

Figure 6:
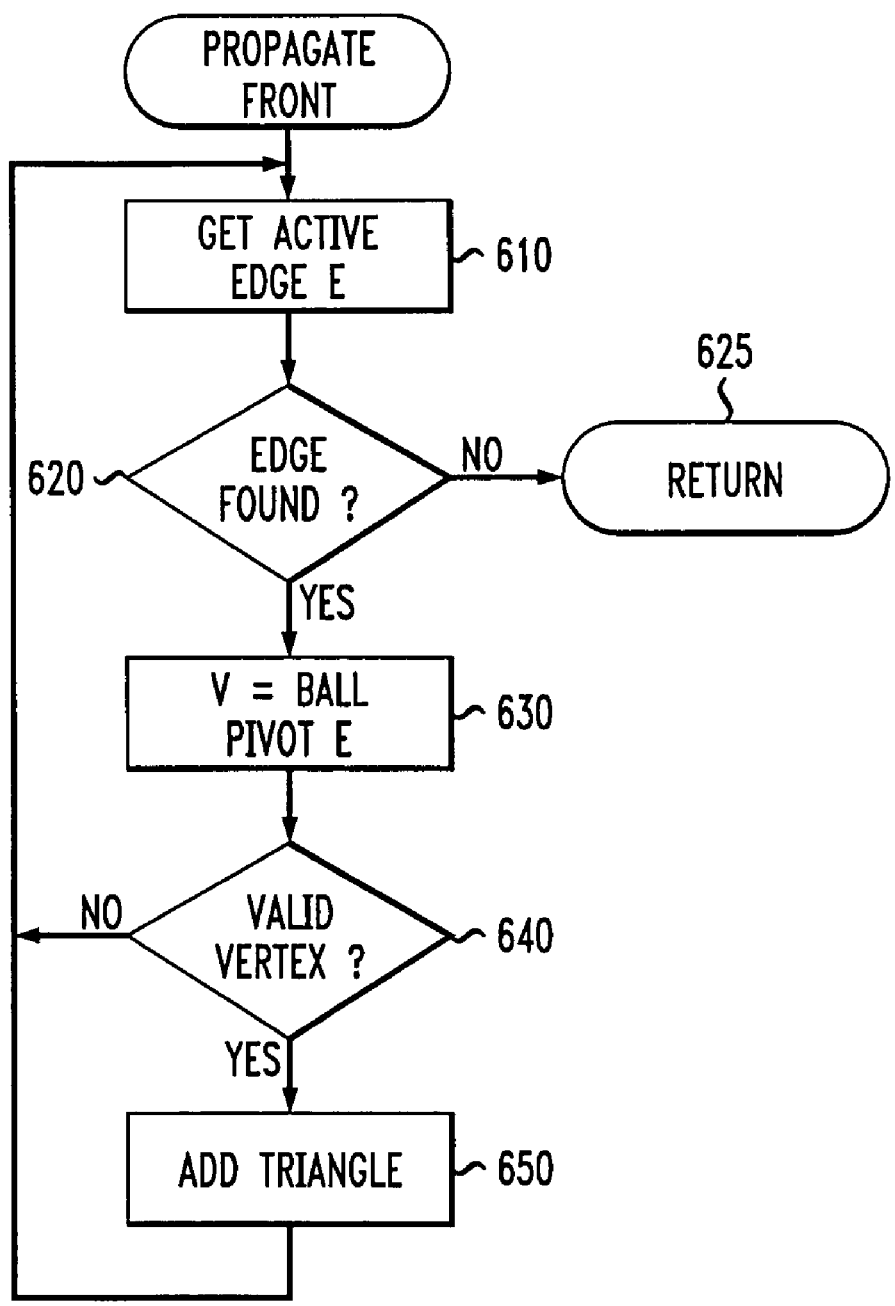
FIG. 6 is a flow chart describing a front propagation process utilized by the ball-pivoting algorithm of FIG. 3.

As previously indicated, the ball-pivoting algorithm 300 creates triangles connecting data points during step 360 by applying successive ball-pivoting operations to the current active-edge front. FIG. 6 is a flow chart describing an edge-front propagation process 600. As shown in FIG. 6, a candidate edge, E, is initially extracted during step 610 from the current front, represented by the data structures discussed further below in conjunction with FIG. 9. A test is performed during step 620 to determine if an edge was found. If it is determined during step 620 that such an edge could not be found, then program control is returned to step 370 of the ball-pivoting algorithm 300 during step 625. If, however, it is determined during step 620 that such an edge could be found, then a ball-pivoting operation, discussed further below in a section entitled "Ball Pivoting," is attempted during step 630.

A test is performed during step 640 to determine if a valid vertex is found. If it is determined during step 640 that a valid vertex has not been found, then program control returns to step 610 to consider a new edge. If, however, it is determined during step 640 that a valid vertex has been found, then a new triangle joining the pivoting edge and the found vertex is created and added to the triangle mesh during step 650. In addition, the active-edge front is adjusted during step 650 to incorporate the new edges. Thereafter, program control returns to step 610 and continues in the manner described above.

Figure 7:
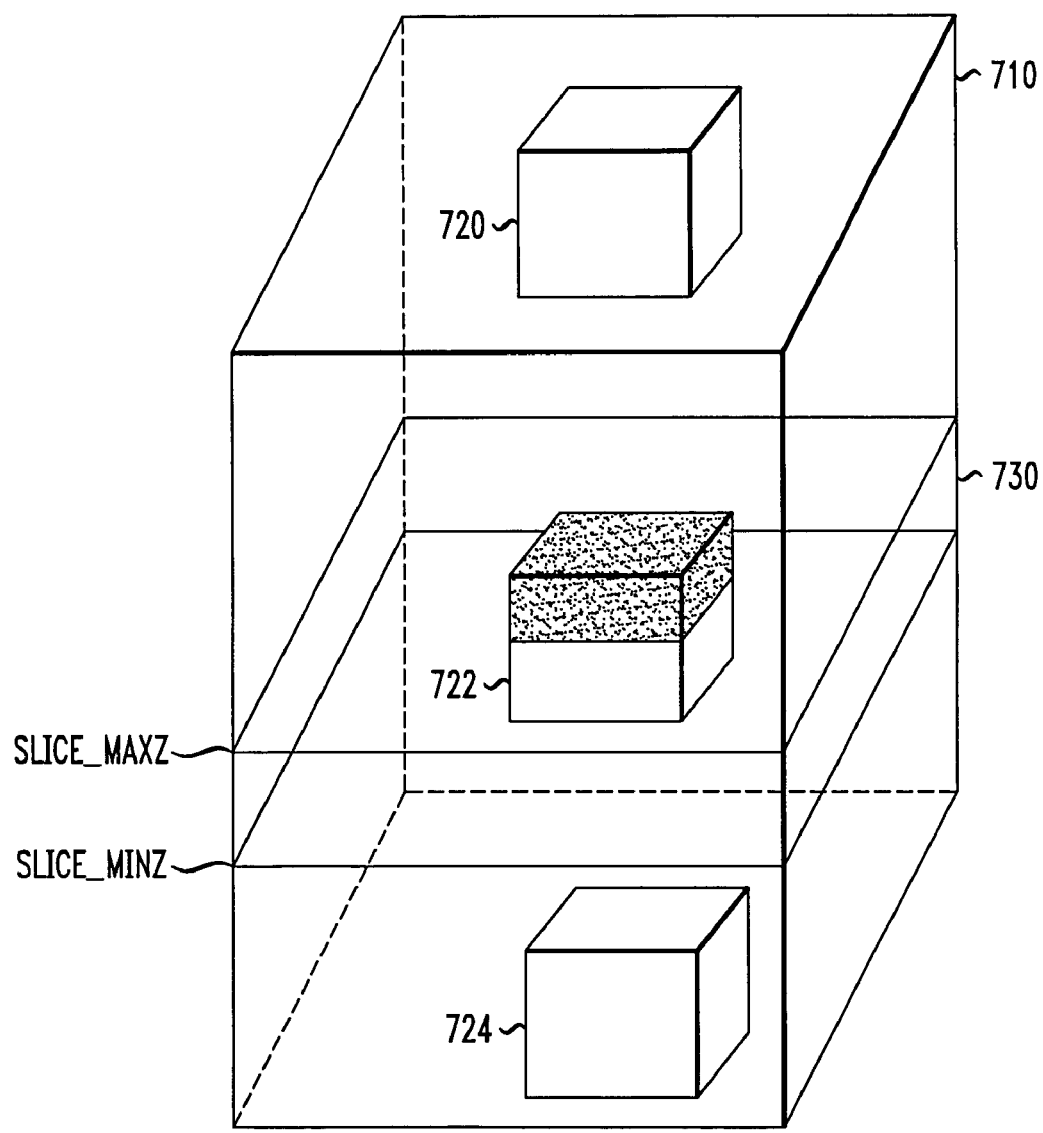
FIG. 7 is a block diagram showing the slice-by-slice processing of scans by the ball-pivoting algorithm of FIG. 3.

FIG. 7 is a block diagram showing the slice-by-slice processing of scans in the ball-pivoting algorithm 300. As shown in FIG. 7, a bounding box 710, computed during step 420 of the data structure initialization process 400, contains all scans. The bounding boxes of three scans 720, 722 and 724 are also depicted for illustrative purposes. The current slice 730 is represented by its two bounding planes slice_minz and slice_maxz. The diagram illustrates the state of the data structures at an intermediate moment in the processing. Assuming that the active slice is moving from the bottom of the bounding box 710 towards the top of the box 710, scan 724 has already been processed and its data points have been removed from memory. Scan 722 is currently being processed. Scan 720 has not been processed yet, and will be processed when the active slice intersects its bounding box.

FIG. 8A is a diagram showing how input scan data can be stored in a file in an external storage device. As shown in FIG. 8A, each scan point is represented by two lines of data. The first line represents the three coordinates of the data point. The second line represents the three components of an estimated surface normal at the data point.

FIG. 8B is a diagram illustrating how data points are stored in memory. Only points from scans whose bounding box 710 intersects the current slice are stored. As shown in FIG. 8B, the information 820 stored for each point includes a unique vertex identifier, the three coordinates of the point, its associated normal, a unique identifier of the scan to which the point belongs, and a boolean flag that indicates whether or not the point is part of the triangle mesh. The set of points is stored in a list 822. A three-dimensional voxel grid 824 (shown in two-dimensions in FIG. 8B for illustration) is used to index into the list 822 by location. Each cell, or voxel (volume element) in the grid 824 corresponds to a small cubic portion of space. Points contained in one voxel are stored contiguously in the list 822. Each voxel in the grid 824 stores a pointer to the first point in the list contained in the voxel. The set of points contained in the voxel extends from the one pointed by the voxel itself to the one before the point pointed to by the next voxel. In FIG. 8B, the representative voxel 830 contains points from PI to PK-1.

In one implementation of the ball-pivoting algorithm 300, an efficient lookup of the subset of points contained in a small spatial neighborhood is required. The spatial query can be implemented using the regular grid of cubic cells, or voxels, shown in FIGS. 8A and 8B. Each voxel has sides of size $\delta = 2\rho$. Data points are stored in the list 822, and the list is organized using bucket-sort so that points lying in the same voxel form a contiguous sublist. Each voxel stores a pointer to the beginning of its sublist of points (to the next sublist if the voxel is empty). An extra voxel at the end of the grid stores a NULL pointer. To visit all points in a voxel it is sufficient to traverse the list from the node pointed to by the voxel to the one pointed to by the next voxel.

Given a point $\rho$, the voxel V it lies in can be found by dividing its coordinates by $\delta$. Generally, all points within 2 $\rho$ distance from $\rho$ need to be looked up, which are a subset of all points contained in the 27 voxels adjacent to V (including V itself). The grid arrangement of the present invention allows constant-time access to the points. Its size would be prohibitive if a large data set were processed in one step, but an out-of-core implementation, described herein, can process the data in manageable chunks. Memory usage can be further reduced, at the expense of a slower access, using more compact representations, such as a sparse matrix data structure.

FIG. 9A is a diagram showing an example of the active-edge front. Multiple loops of edges are possible at any time during the construction of the triangle mesh. FIG. 9A shows two loops 950, 960. Loop 950 includes a sequence of edges and vertices. For example, two consecutive edges 920, 922 connect vertices 928, 930 and 932. The patches of surface inside loops 950 and 960 has been already triangulated. Each edge in the loop has one adjacent triangle. For example, edge 922 is adjacent to triangle 942, while vertex 920 is adjacent to triangle 940.

FIG. 9B is a diagram illustrating the data structures used to represent the active-edge front shown in FIG. 9A. As shown in FIG. 9B, each vertex on the edge front is represented by a record 910 containing a unique identifier, an identifier of the loop to which the vertex belongs, pointers to previous and following edges in the loop, an identifier of the scan the point is from, and its three coordinates. Each front edge is represented by a record 912 containing a unique identifier, an identifier of the loop to which the edge belongs, pointers to previous and following vertices in the loop, an identifier of the vertex opposite to the edge in the adjacent triangle, and the coordinates of the center of the pivoting ball that created the adjacent triangle in a previous ball-pivoting operation. Finally, each loop is represented by a pointer 914 to any one of the edges on the loop.

Thus, the active-edge front, F, is represented as a collection of linked lists of edges, and is initially composed of a single loop containing the three edges defined by the first seed triangle. Keeping all this information with each edge makes it simpler to pivot the ball around the edge. The reason the front is a collection of linked lists, instead of a single one, is that as the ball pivots along an edge, depending on whether it touches a newly encountered data point or a previously used one, the front changes topology. The ball-pivoting algorithm of the present invention handles all cases with two simple topological operators, join and glue, discussed below in a section entitled "Join and Glue Operations," which ensure that at any time the front is a collection of linked lists.

Seed Selection

Given data satisfying the conditions of the reconstruction theorem discussed above, one seed per connected component is enough to reconstruct the entire manifold. A simple way to find a valid seed is to:
  i. Pick any point $\sigma$ not yet used by the reconstructed triangulation;
  ii. Consider all pairs of points $\sigma_a$, $\sigma_b$ in its neighborhood in order of distance from $\sigma$;
  iii. Build potential seed triangles $\sigma$, $\sigma_a$, $\sigma_b$;
  iv. Check that the triangle normal is consistent with the vertex normals, i.e. pointing outward;
  v. Test that a $\rho$-ball with center in the outward halfspace touches all three vertices and contains no other data point; and
  vi. Stop when a valid seed triangle has been found.

In the presence of noisy, incomplete data, it is important to select an efficient seed-searching strategy. Given a valid seed, the algorithm 300 builds the largest possible connected component containing the seed. Noisy points lying at a distance slightly larger than 2ρ from the reconstructed triangulation could form other potential seed triangles, leading to the construction of small sets of triangles lying close to the main surface (see FIG. 2H). These small components are an artifact of the noise present in the data, and are usually undesired. While they are easy to eliminate by post-filtering the data, a significant amount of computational resources is wasted in constructing them.

The following has been observed. If only one data point per voxel is considered as a candidate vertex for a seed triangle, components spanning a volume larger than a few voxels cannot be missed. Also, for a given voxel, consider the average normal n of points within it. This normal approximates the surface normal in that region. Since the ball should walk "on" the surface, it is convenient to first consider points whose projection onto n is large and positive.

Thus, a list of non-empty voxels is maintained. These voxels are searched for valid seed triangles, and when one is found, a triangulation is built using pivoting operations. When no more pivoting is possible, the search is continued for a seed triangle from where the algorithm had stopped, skipping all voxels containing a point that is now part of the triangulation. When no more seeds can be found, the algorithm stops.

Join and Glue Operations

Figure 10:
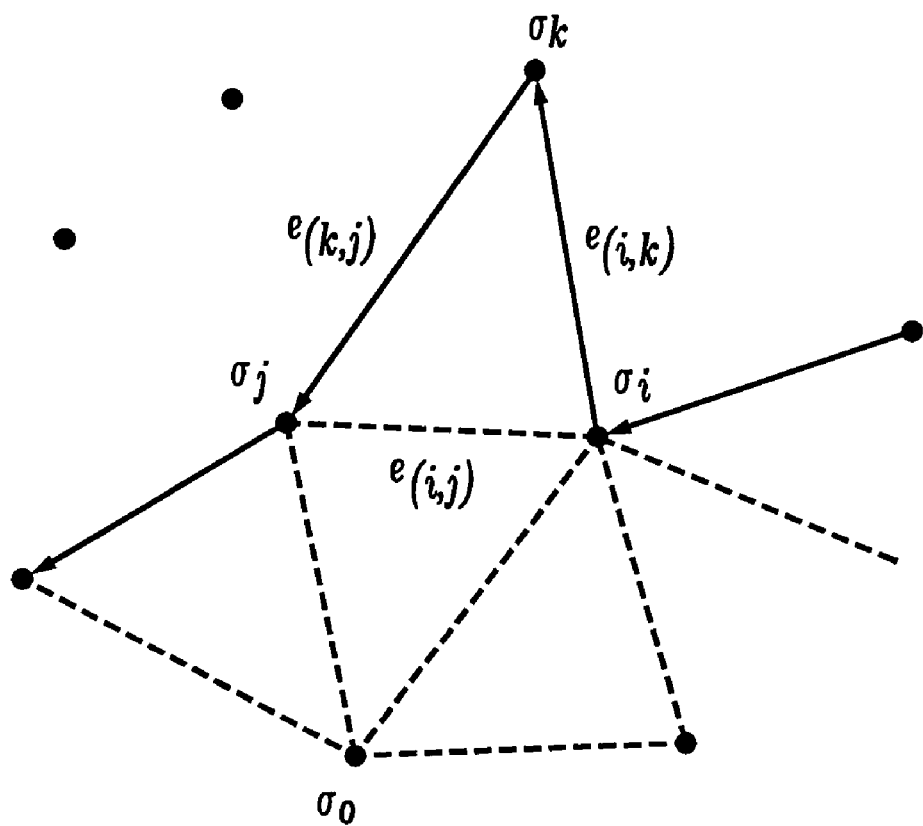
FIG. 10 illustrates a join operation in accordance with the present invention.
Figure 11A:
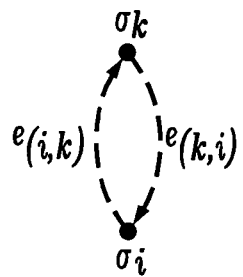
FIG. 11 illustrates four cases where the glue operation is applied when the join operation of FIG. 10 has created an edge identical to an existing edge, but with opposite orientation.
Figure 11B:
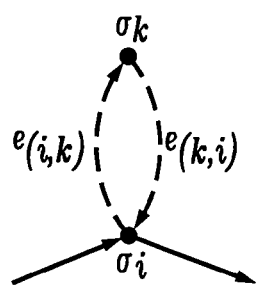
Figure 11C:
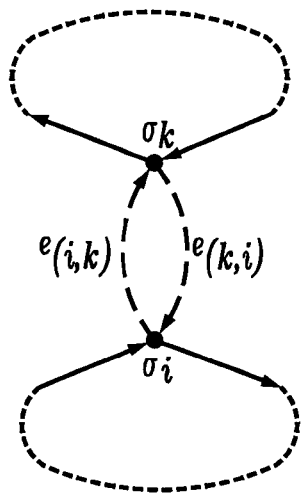
Figure 11D:
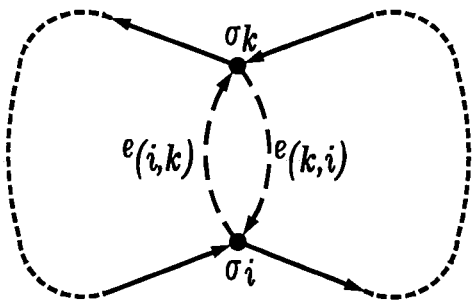
Figure 12A:
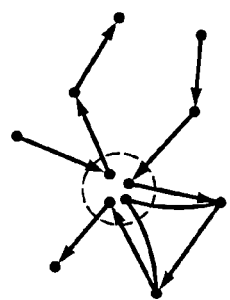
FIG. 12 illustrates a sequence of join and glue operations.
Figure 12B:
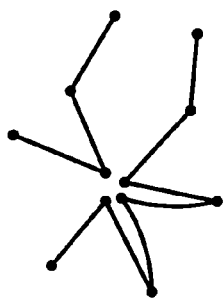
Figure 12C:
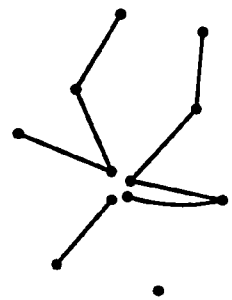
Figure 12D:
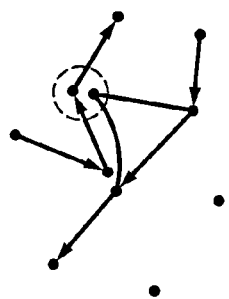
Figure 12E:
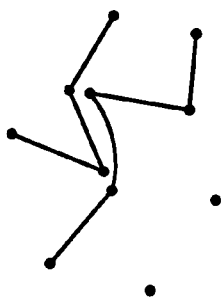
Figure 12F:
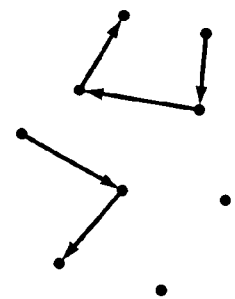

The join and glue operations generate triangles while adding and removing edges from the front loops. The join operation, shown in FIG. 10, is used when the ball pivots around edge $e_{(i,j)}$, touching a not_used vertex $\sigma_k$ (i.e., $\sigma_k$ is a vertex that is not yet part of the mesh). In this case, the triangle ($\sigma_i$, $\sigma_k$, $\sigma_j$) is output, and the front is locally modified by removing edge $e_{(i,j)}$ and adding the two edges $e_{(i,k)}$ and $e_{(k,j)}$.

When $\sigma_k$ is already part of the mesh, one of two cases can arise:

i. $\sigma_k$ is an internal mesh vertex, (i.e., no front edge uses $\sigma_k$). The corresponding triangle cannot be generated, since it would create a non-manifold vertex. In this case, $e_{(i,j)}$ is simply marked as a boundary edge;

ii. $\sigma_k$ belongs to the front. After checking edge orientation to avoid creating a non-orientable manifold, a join operation is applied, and the new mesh triangle ($\sigma_i$, $\sigma_k$, $\sigma_j$) is output. The join operation could potentially create (one or two) pairs of coincident edges (with opposite orientation), which are removed by the glue operation.

Thus, the glue operation is applied when the join operation creates an edge identical to an existing edge, but with opposite orientation. The glue operation, shown in FIG. 11, removes pairs of coincident edges from the front, with opposite orientation (coincident edges with the same orientation are never created by the algorithm 300) and adjusts the front accordingly. For example, when edge $e_{i,k}$ is added to the front by a join operation (the same applies to $e_{(k,j)}$), if edge $e_{(k,i)}$ is on the front, glue will remove the pair of edges $e_{(i,k)}$, $e_{(k,i)}$ and adjust the front accordingly.

FIG. 11 illustrates four cases where the glue operation is applied when the join operation has created an edge identical to an existing edge, but with opposite orientation. FIG. 11(a) illustrates when the two edges form a loop. In this case, the loop is deleted from the front. FIG. 11(b) illustrates when two edges belong to the same loop and are adjacent. In this case, the edges are removed and the loop is shortened. FIG. 11(c) illustrates when the two edges are not adjacent, and they belong to the same loop. In this case, the loop is split into two. FIG. 11(d) illustrates when the edges are not adjacent and belong to two different loops. In this case, the loops are merged into a single loop.

FIG. 12 illustrates a sequence of join and glue operations. FIG. 12(a) illustrates a new triangle being added to the existing front. The four front vertices inside the dashed circle all represent a single data point. As shown in FIG. 12(b) a join operation removes an edge and creates two new front edges, coincident with existing ones. In FIGS. (c) and (d), two glue operations remove coincident edge pairs. FIG. 12(d) also shows the next triangle added. In FIG. 12(e), only one of the edges created by this join operation is coincident with an existing edge. In FIG. 12(f), one glue operation removes the duplicate pair.

Variations

While the present invention has been described herein using an illustrative implementation that does not process or acquire color, the present invention can be applied to an implementation that generates a color representation as would be apparent to a person of ordinary skill in the art based on the disclosure herein. See, for example, U.S. Pat. No. 5,974,168, incorporated by reference herein.

Furthermore, by using weighted points, the ball-pivoting algorithm 300 might be able to generate triangulations of adaptive samplings. The sampling density could be changed depending on local surface properties, and point weights accordingly assigned or computed. An extension of the algorithm 300 along the lines of the weighted generalization of alpha-shapes should be able to generate a more compact, adaptive, interpolating triangulation.

It is to be understood that the embodiments and variations shown and described herein are merely illustrative of the principles of this invention and that various modifications may be implemented by those skilled in the art without departing from the scope and spirit of the invention.

What is claimed is:

1. A computer implemented method for reconstructing a surface of an object, said method comprising the steps of:
   obtaining multiple sets of three-dimensional scan data of said object;
   finding a seed triangle in said scan data to form a triangulated mesh;
   pivoting a ball around an edge of said triangulated mesh until a new point in said scan data is hit by said ball, wherein said edge and said new point define a new triangle;
   adding said new triangle to said triangulated mesh;
   selecting a new edge of said triangulated mesh and repeating said finding, pivoting and adding steps until all points in said scan data have been used or a valid seed triangle cannot be formed.

2. The method of claim 1, wherein step of finding a seed triangle further comprises the step of finding a triangle such that a ball of radius ρ touching each point in said seed triangle contains no other data point in said scan data.

3. The method of claim 1, wherein said step of finding a seed triangle further comprises the steps of:
   i. picking any point σ not yet used by said mesh;
   ii. considering all pairs of points $\sigma_a$, $\sigma_b$ in a neighborhood of said point in order of distance from σ;
   iii. building potential seed triangles σ, $\sigma_a$, $\sigma_b$;

iv. checking that the triangle normal points outward;

v. testing that a ρ-ball with center in the outward halfspace touches all three vertices and contains no other data point, and vi. stopping when a valid seed triangle has been found.

4. The method of claim 1, wherein said reconstructed surface is a manifold subset of an alpha-shape of a point set.

5. The method of claim 1, wherein said three-dimensional scan data is acquired using a laser range scanner.

6. The method of claim 1, wherein said three-dimensional scan data is acquired using a stereographic system.

7. The method of claim 1, further comprising the step of registering said scan data to align said multiple sets of scan data into a single coordinate system.

8. The method of claim 1, wherein a radius, ρ, of said ball is selected such that said three-dimensional scan data of said object is dense enough that said ball of radius ρ cannot pass through a surface without touching points in said scan data.

9. The method of claim 1, wherein the intersection of any ball of radius ρ with said object must be a topological disk, such that the radius of curvature of said object is larger than ρ, and that the ball of radius ρ can also pass through cavities and other concave features of said object without multiple contacts with the surface of said object.

10. The method of claim 1, wherein said data points are stored in a list, and said list is organized using a bucket-sort so that points lying in a same voxel form a contiguous sublist, wherein each voxel stores a pointer to the beginning of its sublist of points.

11. The method of claim 10, wherein an active-edge front of said mesh is represented as a collection of linked lists of edges, and is initially composed of a single loop containing the three edges defined by said seed triangle.

12. The method of claim 11, wherein each edge of the front is represented by its two endpoints, the opposite vertex, the center of the ball that touches all three points, and links to a previous and next edge along in the same loop of the front.

13. The method of claim 1, wherein said step of pivoting a ball further comprises the step of labeling said edge as a boundary edge if no other point is hit by the ball.

14. A computer implemented method for reconstructing a surface of an object, said method comprising the steps of:

i. obtaining multiple sets of three-dimensional scan data of said object;

ii. placing a ball of a given radius in contact with three initial points in said scan data, said three initial points forming a one-triangle mesh;

iii. keeping said ball in contact with two endpoints of an edge on an active-edge front of said mesh and pivoting said ball until it touches another point in said scan data;

iv. forming a new triangle with said triplet of points contacted by said ball;

v. adding said new triangle to said mesh;

vi. selecting a new edge on said active-edge front of said mesh and repeating steps iii. through v.

15. The method of claim 14, wherein step of placing a ball comprises the step of finding a triangle such that a ball of radius ρ touching each point in said seed triangle contains no other data point in said scan data.

16. The method of claim 14, wherein said step of placing a ball further comprises the steps of:

i. picking any point σ not yet used by said mesh;

ii. considering all pairs of points $σ_a$, $σ_b$ in a neighborhood of said point in order of distance from σ;

iii. building potential seed triangles σ, $σ_a$, $σ_b$;

iv. checking that the triangle normal points outward;

v. testing that a ρ-ball with center in the outward halfspace touches all three vertices and contains no other data point; and vi. stopping when a valid seed triangle has been found.

17. The method of claim 14, wherein said reconstructed surface is a manifold subset of an alpha-shape of the point set.

18. The method of claim 14, wherein said three-dimensional scan data is acquired using a laser range scanner.

19. The method of claim 14, wherein said three-dimensional scan data is acquired using a stereographic system.

20. The method of claim 14, further comprising the step of registering said scan data to align said multiple sets of scan data into a single coordinate system.

21. The method of claim 14, wherein a radius, ρ, of said ball is selected such that said three-dimensional scan data of said object is dense enough that said ball of radius ρ cannot pass through a surface without touching points in said scan data.

22. The method of claim 14, wherein the intersection of any ball of radius ρ with said object must be a topological disk, such that the radius of curvature of said object is larger than ρ, and that the ball of radius ρ can also pass through cavities and other concave features of said object without multiple contacts with the surface of said object.

23. The method of claim 14, wherein said data points are stored in a list, and said list is organized using a bucket-sort so that points lying in the same voxel form a contiguous sublist, wherein each voxel stores a pointer to the beginning of its sublist of points.

24. The method of claim 23, wherein an active-edge front of said mesh is represented as a collection of linked lists of edges, and is initially composed of a single loop containing the three edges defined by said seed triangle.

25. The method of claim 24, wherein each edge of the front is represented by its two endpoints, the opposite vertex the center of the ball that touches all three points, and links to the previous and next edge along in the same loop of the front.

26. The method of claim 14, wherein said step of pivoting a ball further comprises the step of labeling said edge as a boundary edge if no other point is hit by the ball.

27. A system for reconstructing a surface of an object, comprising:

a memory that stores computer-readable code; and a processor operatively coupled to said memory, said processor configured to execute said computer-readable code, said computer-readable code configured to implement the following steps:

obtain multiple sets of three-dimensional scan data of said object;

find a seed triangle in said scan data to form a triangulated mesh;

pivot a ball around an edge of said triangulated mesh until a new point in said scan data is hit by said ball, wherein said edge and said new point define a new triangle;

add said new triangle to said triangulated mesh;

select a new edge of said triangulated mesh and repeating said finding, pivoting and adding steps until all points in said scan data have been used or a valid seed triangle cannot be formed.

28. A system for reconstructing a surface of an object, comprising:
- a memory that stores computer-readable code; and
- a processor operatively coupled to said memory, said processor configured to execute said computer-readable code, said computer-readable code configured to implement the steps of:
  i. obtain multiple sets of three-dimensional scan data of said object;
  ii. place a ball of a given radius in contact with three initial points in said scan data, said three initial points forming a mesh;
  iii. keep said ball in contact with two endpoints of an edge on an active-edge front of said mesh and pivoting said ball until it touches another point in said scan data;
  iv. form a new triangle with triplets of points contacted by said ball;
  v. add said new triangle to said mesh;
  vi. select a new edge on said active-edge front of said mesh and repeat steps iii. through v.

29. An article of manufacture for reconstructing a surface of an object, comprising:
- a computer readable medium having computer readable program code means embodied thereon, said computer readable program code means comprising:
- a step to obtain multiple sets of three-dimensional scan data of said object;
- a step to find a seed triangle in said scan data to form a triangulated mesh;
- a step to pivot a ball around an edge of said triangulated mesh until a new point in said scan data is hit by said ball, wherein said edge and said new point define a new triangle;
- a step to add said new triangle to said triangulated mesh;
- a step to select a new edge of said triangulated mesh and repeating said finding, pivoting and adding steps until all points in said scan data have been used or a valid seed triangle cannot be formed.

30. An article of manufacture for reconstructing a surface of an object, comprising:
- a computer readable medium having computer readable program code means embodied thereon, said computer readable program code means comprising steps to:
  i. obtain multiple sets of three-dimensional scan data of said object;
  ii. place a ball of a given radius in contact with three initial points in said scan data, said three initial points forming a mesh;
  iii. keep said ball in contact with two endpoints of an edge on an active-edge front of said mesh and pivoting said ball until it touches another point in said scan data;
  iv. form a new triangle with triplets of points contacted by said ball;
  v. add said new triangle to said mesh;
  vi. select a new edge on said active-edge front of said mesh and repeat steps iii. through v.

* * * * *

UNITED STATES PATENT AND TRADEMARK OFFICE
CERTIFICATE OF CORRECTION

PATENT NO. : 6,968,299 B1 Page 1 of 1
DATED : November 22, 2005
INVENTOR(S) : Bernardini et al.

It is certified that error appears in the above-identified patent and that said Letters Patent is hereby corrected as shown below:

Column 12,
Line 19, before "920" and after "while" replace "vertex" with -- edge --.

Column 15,
Line 40, after "the opposite vertex" insert -- , --.

Signed and Sealed this

Twenty-fifth Day of April, 2006

JON W. DUDAS
*Director of the United States Patent and Trademark Office*